Dec. 22, 1931. W. R. SCARLETT 1,838,004
ENGINE STARTER
Filed Oct. 13, 1930
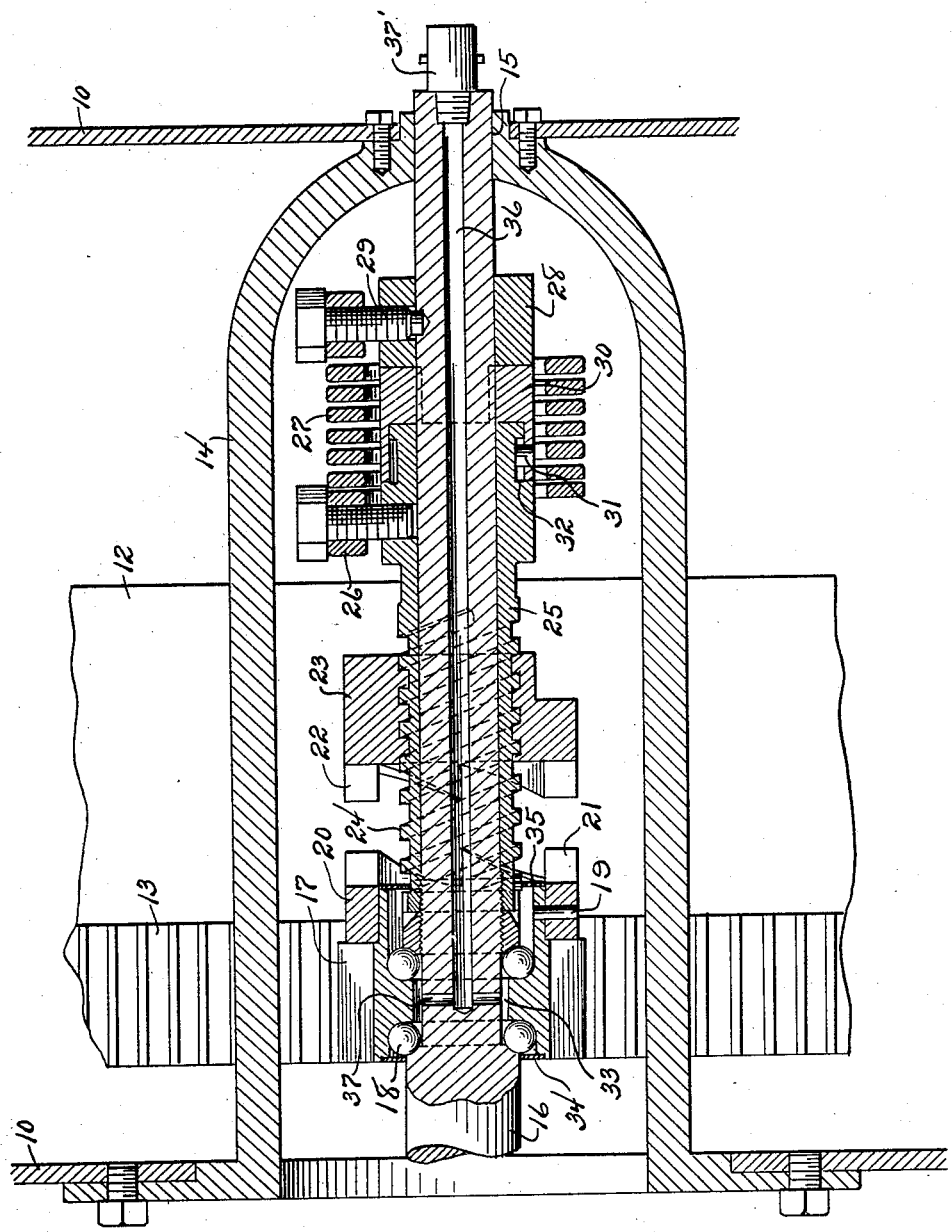
William Ross Scarlett
INVENTOR
BY Victor J. Evans
ATTORNEY Patented Dec. 22, 1931

1,838,004

UNITED STATES PATENT OFFICE

WILLIAM ROSS SCARLETT, OF LAKE CHARLES, LOUISIANA

ENGINE STARTER

Application filed October 13, 1930. Serial No. 488,453.

This invention relates to improvements in starting devices for internal combustion engines and has for an object the provision of a starter of the Bendix type which is so constructed that the driving pinion will be in constant engagement with the ring gear, and thus reduce wear and eliminate danger of injury to the teeth of the gear such as frequently occurs when the pinion moves into and out of engagement with said gear.

Another object of the invention is the provision of means for mounting the shaft of the starter motor, whereby the latter may be used to supply lubricant to the bearing for the pinion, without danger of the lubricant interfering with the proper operation of the starter.

With the above and other objects in view, the invention further includes the following novel features and details of construction, to be hereinafter more fully described, illustrated in the accompanying drawing and pointed out in the appended claims.

In the drawing the figure shown is a sectional view showing a fragmentary portion of the ring gear ordinarily employed in a Bendix starter, with the invention applied.

Referring to the drawing in detail wherein like characters of reference denote corresponding parts, the reference character 10 indicates fragmentary portions of the housing of an engine fly wheel, a portion of the latter being indicated at 12. The reference character 13 indicates a portion of a ring gear carried by the fly wheel as is usual in engine starters of this type.

The reference character 14 indicates a frame whose opposite ends are attached to the fly wheel housing 10 and extending into this frame and having a bearing 15 at one end thereof, is the shaft 16 of a starter motor, the motor being omitted.

Mounted upon the shaft 16 is a pinion 17 which is in constant mesh with the gear 13, and this pinion operates upon anti-friction bearings 18 to reduce wear.

Secured to the pinion by means of a pin 19, or any other suitable securing means is a clutch member 20. This member is provided with beveled teeth 21 which are adapted to be engaged by beveled teeth 22 provided upon a clutch member 23. This last named clutch member is interiorly threaded for engagement with the threads 24 provided upon the periphery of a sleeve 25 which is mounted upon the shaft 16.

The sleeve 25 is rotatable with respect to the shaft and has connected to one end as shown at 26, one end of a torsion spring 27. The opposite end of this spring is secured to a collar 28 which is fast with the shaft 16 as shown at 29. The collar 28 is in locking engagement with a collar 30 and this last mentioned collar carries a pin 31 which operates in an annular groove 32 in the adjacent end of the sleeve 25. The sleeve may thus rotate with respect to the collars 28 and 30, but rotation will be yieldingly resisted by the spring 27.

In the operation of the invention when the motor shaft 16 rotates, starting movement of this shaft will cause the clutch member 23 to move along the threads of the sleeve 25 so that the teeth 22 of this clutch member will engage the teeth 21 of the clutch member 20 and lock the pinion 17 to the sleeve. The clutch member 23 is weighted so as to cause it to move along the threads. Any shock or jar incident to locking the pinion 17 to the sleeve will be absorbed by the spring 27 so that there will be a yieldable locking action between the pinion 17 and the shaft 25.

The pinion 17 is spaced from the shaft 16 so as to provide an annular lubricant chamber 33 whose opposite side walls are formed by rings 34 and 35 at opposite sides of the bearing 18. The purpose of this construction is to provide means for lubricating the pinion bearing and at the same time prevent the lubricant from reaching the outer periphery of the sleeve 25 where it might interfere with the proper movement of the clutch member 23.

In order to conduct lubricant to the chamber 33 without having the lubricant reach the outer periphery of the sleeve, the shaft 16 is provided with a lubricant passage 36. The inner end of this passage is in communication with the lubricant chamber through radial passages 37, while the outer end of the passage 36 is provided with a suitable connection 37 for the attachment of a grease gun.

The invention is susceptible of various changes in its form, proportions and minor details of construction and the right is herein reserved to make such changes as properly fall within the scope of the appended claims.

Having described the invention what is claimed is:—

1. In an engine starter including a motor driven shaft, a pinion freely rotatable upon said shaft for constant engagement with the fly wheel gear of an engine, an anti-friction bearing for the pinion, means to hold said pinion against longitudinal movement upon said shaft, a clutch member rigid with the pinion, a weighted clutch member threadedly engaged with and rotatable upon the shaft and adapted to lock the pinion to the shaft when the latter is rotated, and means to take up shock between the pinion and shaft when locking action occurs.

2. In an engine starter including a motor driven shaft, a pinion freely rotatable upon said shaft for constant engagement with the fly wheel of an engine, an anti-friction bearing for the pinion, means to hold said pinion against longitudinal movement upon said shaft, an exteriorly threaded sleeve upon the shaft, a weighted clutch member rotatable upon and threadedly engaging the sleeve to engage the first mentioned clutch member and lock the pinion to the sleeve, and means to take up shock between the pinion and shaft when locking action occurs.

3. In an engine starter including a motor driven shaft, a pinion freely rotatable upon said shaft for constant engagement with the fly wheel of an engine, an anti-friction bearing for the pinion, means to hold said pinion against longitudinal movement upon said shaft, an exteriorly threaded sleeve upon the shaft, a weighted clutch member rotatable upon and threadedly engaging the sleeve to engage the first mentioned clutch member and lock the pinion to the sleeve, and a torsion spring having one end secured to the sleeve and the other end secured to the shaft to take up shock between the pinion and shaft when locking action occurs.

4. In an engine starter including a motor driven shaft, a pinion freely rotatable upon said shaft for constant engagement with the fly wheel gear of an engine, an anti-friction bearing for the pinion, means to hold said pinion against longitudinal movement upon said shaft, a clutch member rigid with the pinion, a weighted clutch member threadedly engaged with and rotatable upon the shaft and adapted to lock the pinion to the shaft when the latter is rotated, means to take up shock between the pinion and shaft when locking action occurs, said shaft having a lubricant passage extending longitudinally thereof, an annular lubricant chamber for the pinion bearing, and means providing communication between the lubricant passage and bearing.

In testimony whereof I affix my signature.

WILLIAM ROSS SCARLETT.